United States Patent [19]
Molitor

[11] 3,935,737
[45] Feb. 3, 1976

[54] FLOW INDICATOR
[76] Inventor: Arvid A. Molitor, 1101 Florimond Drive, Elgin, Ill. 60120
[22] Filed: Mar. 6, 1975
[21] Appl. No.: 555,894

[52] U.S. Cl. ............................... 73/228; 340/239 R
[51] Int. Cl.² ........................................... G01F 1/28
[58] Field of Search ................... 73/228; 340/239 R

[56] References Cited
UNITED STATES PATENTS
3,602,037  8/1971  Neu .................................. 73/228 X Primary Examiner—Richard C. Queisser
Assistant Examiner—John P. Beauchamp
Attorney, Agent, or Firm—Kinzer, Plyer, Dorn & McEachran

[57] ABSTRACT

A method and apparatus for measuring fluid flow by optically detecting the deflection of a tube extended transversely across a vessel normal to the direction of flow. A light source directs a beam of light axially into one end of the tube and the intensity of the beam is measured at the other end. Fluid flowing in the vessel tends to deflect the tube in the direction of flow thereby intercepting a portion of the beam and decreasing the intensity of light at the other end as a function of the rate of flow through the vessel.

11 Claims, 3 Drawing Figures

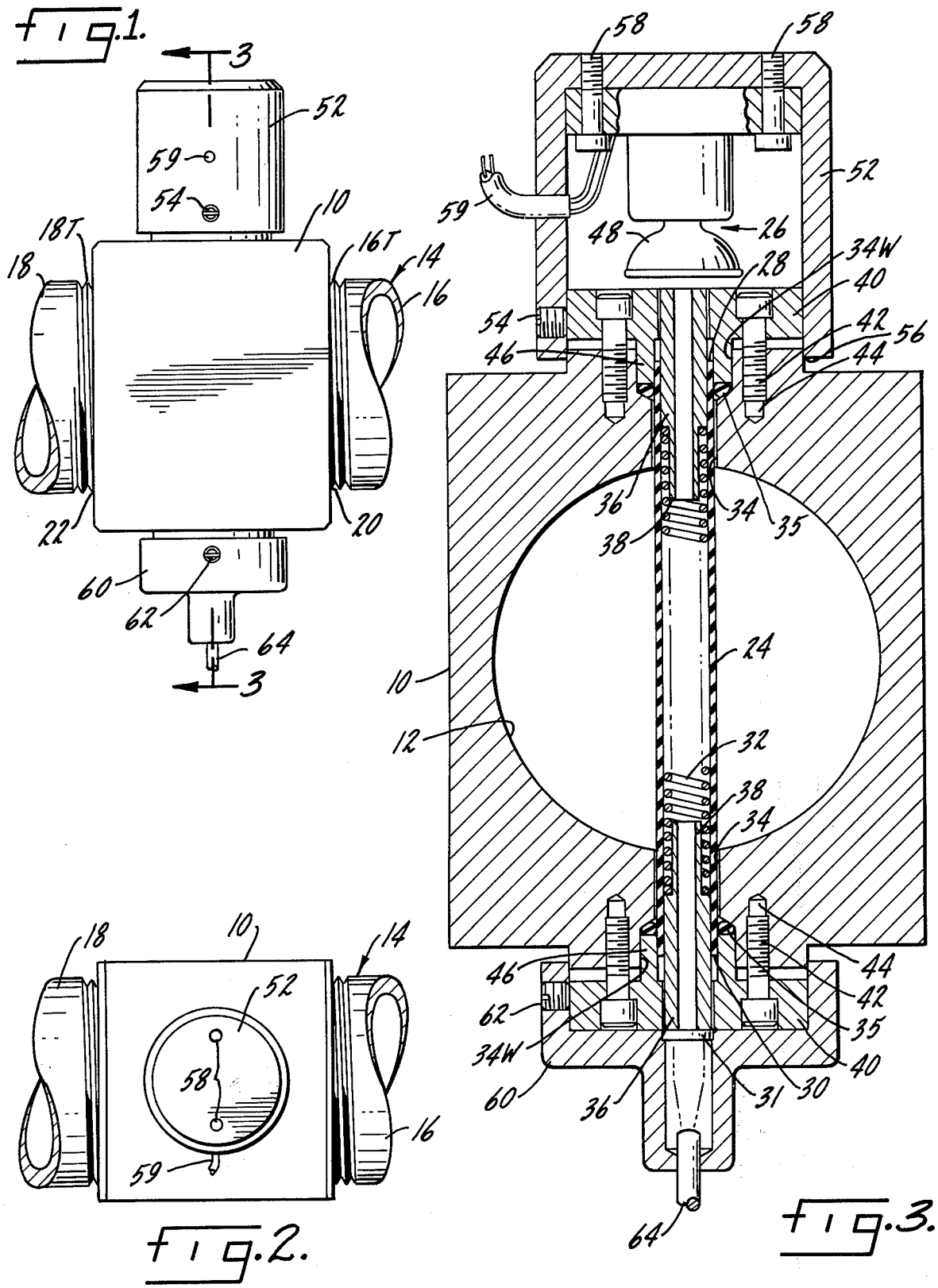

FLOW INDICATOR

SUMMARY OF THE INVENTION

This invention relates to fluid flow indicators, and more particularly, to an indicator in which an optical sensor measures the deflection of a flexible tube as a measurement of fluid flow.

A primary object of the present invention is a flow indicator which measures fluid flow by optically sensing the deflection of a tube extended transversely across the path of flow through a vessel.

Another object is a flow indicator which is acurate and readily responsive to changes in flow rate, yet constructed as a generally rugged and durable device.

Another object is a flow indicator adaptable for measuring a wide range of flow rates of both liquid and gases.

Another object is a flow indicator which is bidirectional having the capability of measuring flow in either direction through a vessel.

Another object is a flow indicator which is easily assembled and installed in a fluid carrying vessel with the operative parts of the device being easily accessible for inspection and servicing.

Another object is a flow indicator which is operable regardless of rotational orientation within a vessel.

Another object is a flow indicator which produces an electrical output adaptable for various readout apparatus.

Another object is a flow indicator which necessitates only a minimal interruption of the flow of fluid being measured.

Another object is a flow indicator in which the optical instruments are protected from exposure to the fluid and any wear and deterioration incidental thereto.

Another object is to provide a method of measuring fluid flow by optically sensing the deflection of a tube transversely spanning the path of flow through a vessel.

BRIEF DESCRIPTION OF THE DRAWINGS

The invention is illustrated diagrammatically in the following drawings wherein:

FIG. 1 is a side view of the flow indicator of the present invention installed along a fluid carrying vessel.

FIG. 2 is a top plan view of the flow indicator of FIG. 1.

FIG. 3 is an enlarged sectional view taken along plane 3—3 of FIG. 1.

DESCRIPTION OF THE PREFERRED EMBODIMENT

A preferred embodiment of the flow indicator of my invention is shown in FIGS. 1–3. A housing 10, which defines an internal chamber 12, is positioned along a conduit 14 between an upstream portion 16 and downstream portion 18. Inlet and outlet openings 20 and 22 are provided in the housing to establish communication between the chamber and upstream and downstream portions of the conduit respectively.

Referring to FIG. 3, a flexible tube 24 is secured relative to the housing and extends across the chamber generally normal to the direction of flow through the conduit. A light source 26 is so positioned relative to one end 28 of tube 24 as to direct a beam of light axially into end 28. At the other end 30 of tube 24, an optical detector 31 measures the intensity of the beam. Thus, any deflection of tube 24 in the direction of flow causes the tube to intersect a portion of the beam and thereby decrease the intensity of the beam at end 30 as a function of the rate of flow through vessel 14.

In accordance with the present invention, more specifically in the preferred embodiment shown in FIGS. 1–3, the inlet and outlet 20 and 22 are longitudinally aligned opposite one another across the chamber and internally threaded (not shown) to receive externally threaded end portions 16T and 18T of the upstream and downstream portions of the conduit. Thus, conduit 14 may be a pipe or conduit of metal, plastic or any other suitable material which is threaded into and sealed against the inlet and outlet just as a standard pipe coupling. In other embodiments, the inlet and outlet may be provided with flared tube fittings, quick release couplings or other suitable means for inserting the flow indicator along a fluid carrying vessel such that the fluid is directed through the chamber of the flow indicator. It is preferred that the path of flow defined by the internal walls of the conduit and chamber be generally continuous and uniform to allow the fluid to flow through the chamber as it would through a continuous length of the conduit. The term, direction of flow, normally refers to the axial downstream direction.

To sense the rate of flow through the conduit, flexible tube 24 extends transversely across the chamber intermediate the inlet and outlet and generally normal to the direction of flow. In the preferred embodiment, tube 24 is simply a flexible enclosure for a spring 32 which longitudinally spans the flexible tube. Spring 32 is shown as a helical spring which is axially aligned with tube 24 with which it is coupled in circumferential engagement like an arm through a sleeve.

To position tube 24 across the chamber, a pair of generally diametrically aligned bores 34 are formed through opposite sides of the housing. The bores are widened as at 34W to accomodate insertion of seal rings 35 which prevent the loss of fluid between the tube and bores.

To partially control the stiffness of a given spring 32, a pair of generally rigid cylindrical rods 36 are inserted through the ends of the tube and into the chamber so as to generally rigidify the length of the spring and tube through which the rods extend. Although the rods are preferably formed with a uniform inside diameter, inward cylindrical extensions 38 are provided which have a reduced outside diameter so that they may be axially insertable into the ends of spring 32 to support the spring and control its stiffness. It will be observed that the longer the stiffening means or extensions 38 are, the shorter the length of spring 32 which is free to flex or bend laterally. Thus, interchangeable stiffening rods 36 may be provided for setting the flexibility of spring 32 to any of a number of pre-determined settings. Likewise, springs of varying spring rates may be provided to further contribute to the wide range of stiffness requirements needed to accomodate fluids of varying characteristics.

As shown in FIG. 3, the stiffening rods 36 extend outward beyond the ends of tube 24 and are carried by a pair of end caps 40. In the preferred embodiment, end caps 40 are basically a pair of generally circular discs fastened to the housing by screws 42 in tapped holes 44 so positioned as to axially align end caps 40 with bores 34. Inwardly extending cylindrical portions 46 of the end caps are adapted to fit within the widened end portions 34W of bores 34 for the purpose of compressing seal rings 35 into engagement against flexible tube 24. The ends of the tubing which are circumferentially engaged about the stiffening rods 36 are themselves carried within the inward cylindrical extensions 46 of the end caps. End caps 40 thus hold and present the open ends of tube 24, in this case as extended by stiffening rods 36, to the light source and detecting means respectively.

Light source 26 is mounted in fixed positional relationship to one end 28 of tube 24 as described below, for the purpose of directing a beam of light axially into that end. The light source may be a relatively small incandescent light bulb or any other suitable means and may be provided with a reflector 48 for directing a beam of light axially toward and into open end 28 of tube 24.

Adjacent the other end 30 of the tube an optical detector 31 is provided for measuring the intensity of the beam at or near end 30. In the preferred form shown, optical detector 31 is a photo-cell engaged directly against the open end of the respective stiffening rod 36 extending from tube end 30. Various types of optical detectors or light sensitive elements may be equally suitable, however. Whereas a photo-cell converts the light energy of the beam transmitted from the light source through tube 24 into an electrical current which may be analyzed using conventional circuitry, a photo-resistive element could similarly be used, the electrical conductivity of which varies in accordance with the amount of light which strikes it.

To shield external light from entering end 28 of the tube, a generally cup-shaped light shield 52 is provided. Light shield 52 overlies its respective end cap 40 over which it is fitted in circumferential engagement and to which it is locked by set screw 54. Note that light shield 52 engages the housing as at 56 to further assure that no external light is allowed to enter the device which might introduce error in the detection of the beam intensity at end 30. In the preferred form shown, light source 26 is mounted within light shield 52 by screws 58. The electrical power to the light source is provided by the lead wires of insulated wire 59 which passes through light shield 52 to be connected to an external electrical power outlet.

Similarly, a second light shield 60 overlies the end cap at end 30 and is secured thereon by set screw 62. The photoelectric cell is mounted on light shield 60 and connected to external readout circuitry through lead wires of insulated wire 64.

The use, operation and function of the invention are as follows:

Installation of the flow indicator of the present invention along a fluid carrying vessel or conduit is accomplished in the same manner as for a plumbing fitting or other coupling depending upon the means of attachment provided at the inlet and outlet and the type of vessel. Once installed, electrical power must be delivered to the light source 26 through insulated wire 59 or any other type of light source must be otherwise activated. The optical detector 31 is to be connected to the readout circuitry through insulated wire 64.

At this point, the flow indicator is operative to indicate the rate of flow of fluid in the vessel. Note that as fluid travels from the upstream portion of the vessel through the chamber toward the downstream portion or vice versa, a force is exerted against flexible tube 24 in the direction of flow. This force is effective to deflect the tube in the direction of flow to a degree depending upon the flexural stiffness of the spring and tube and the length of spring and tube which is permitted to flex by the stiffening rods 36. Since light travels in straight lines, deflection of tube 24 in the downstream direction will cause the upstream side of the tube to intercept or block out a portion of the beam thereby allowing only that portion which is not intercepted to reach the other end 30 of the tube and strike the photo-cell. Since the intensity of only a portion of the beam is necessarily less than that of the entire non-intercepted beam, any flexing of tube 24 will produce a decrease in the intensity of the beam striking optical detector 31.

For example, if a log is to be kept for recording the rate of flow through a vessel, the read out circuitry could be provided with a strip chart recorder or X-Y plotter to provide a continuous and permanent record of flow rate over any given period of time. In other instances, only instantaneous indications of present flow rate may be necessary, in which case, a simple dial indicator may be adequate. In still other instances, an unattended alarm system may be desired, in which case, the read out circuitry could be provided with an alarm system which is activated only in response to a signal from the photo-cell corresponding to a predetermined maximum safe flow level. Various other read out devices, alone or in combination with the above or each other, may be appropriate for individual installations. In any such installation, however, the apparatus which produces the electrical signal which indicates flow rate is that of the invention described herein.

It will be appreciated that the means for detecting the intensity of the light beam at the other end 30 of tube 24 is not limited to a photo resistive element as described above. Any light sensing element which produces an electrical output signal which varies with the intensity of the light being measured is sufficient. A light sensing element of the type described in connection with the "thermal pile" disclosed in the Harrison et al. U.S. Pat. No. 2,357,193 is typical.

The construction of the present invention as an assembly of the parts described above permits an interchangeability of parts which accounts for the capability to measure a wide range of flow rates. Not only may the housing itself be constructed larger or smaller to define a chamber having a diameter similar to that of the fluid carrying vessel, but also for a given housing, the flexibility of the spring and tube combination may be varied to accomodate various fluids. The selection of a stiffer spring will permit measurement of higher flow rates and a lighter spring lower flow rates. Similarly, insertion of stiffening rods 36 having longer cylindrical extensions 38 will tend to rigidify a greater length of the tube within the chamber. If flexibility is permitted over a shorter length, the overall spring and tube combination have a greater resistance to deflection and thus enable measurements of increased fluid flow. Again, the opposite is true with stiffening rods having cylindrical extensions of decreased length. In some instances, a flexible tube may be provided which itself has properties of flexural stiffness which are otherwise furnished by spring 32. In that case, the spring may be eliminated, resulting in further simplification of the device.

Since the flow indicator of the present invention does not depend on the flotation level of any member within the fluid to determine flow rate, it will be recognized that it is operable regardless of its rotational orientation to vessel 14. Without such a limitation, installation is facilitated. Furthermore, since the flexible tube, light source and optical detecting means are all accessible without disengaging the housing from the vessel along which it is inserted, interchangeability of parts and reassembly is greatly facilitated. Finally, since all of the operative parts are substantially visible upon removal of the light shields or covers which are attached by a single set screw, inspection and servicing is a simple operation.

It will be observed that the present invention involves a novel method of measuring the rate of flow through a vessel. Basically, the steps include positioning a flexible tube transversely across the fluid carrying vessel generally normal to the direction of flow, directing a beam of light axially into one end of the tube and detecting the intensity of the beam received at the other end of the tube while allowing fluid flowing through the vessel to deflect the tube in the direction of flow, thereby intersecting a portion of the beam and decreasing its intensity at the other end as a function of fluid flow. Additional steps of this method of measuring flow are recognizable in the above description. For example, this method may include shielding external light from the ends of the tube, adjusting the fluxural stiffness of the tube as described above and transmitting a signal corresponding to the flow rate through the vessel to appropriate read out apparatus.

Although I have described a light source, other forms of energy, such as a laser, may also be satisfactory.

Whereas the preferred form of the invention has been described herein, it should be realized that there may be many modifications, substitutions and alterations thereto.

I claim:

1. A device for measuring fluid flow comprising:
   a housing defining a chamber,
   said housing having an inlet and an outlet communicating with said chamber,
   a flexible tube extending across the chamber intermediate said inlet and outlet and generally normal to the direction of flow through said chamber,
   a light source directing a beam of light axially into one end of said flexible tube,
   means adjacent the other end of the tube for detecting the intensity of said beam at said other end,
   said flexible tube being deflected in response to fluid flow through the chamber, thereby modulating the intensity of light received at said other as a function of the rate of flow through said chamber.

2. The structure of claim 1 further comprising spring means coupled with and longitudinally spanning the flexible tube.

3. The structure of claim 2 wherein the spring means comprises a helical spring axially aligned with and circumferentially engaging the flexible tube.

4. The structure of claim 3 further comprising stiffening means characterized by a pair of generally rigid rods insertable into the chamber through the ends of the tube.

5. The structure of claim 1 wherein the means for detecting the intensity of the beam comprises a photoelectric cell.

6. Structure of claim 1 wherein the chamber is generally cylindrical and further comprising a pair of generally diametrically aligned bores through opposite sides of the housing for receiving the ends of the tube and seal means interposed circumferentially between said tube and bores to prevent fluid loss therebetween.

7. The structure of claim 6 further comprising a pair of end caps fastened to the housing, said end caps carrying the ends of the tube and presenting the same to the light source and detecting means respectively.

8. The structure of claim 7 further comprising a pair of generally cup-shaped light shields so associated with the housing as to overlie said end caps and shield generally all external light from each end of the tube.

9. The structure of claim 8 wherein the light source and detecting means are mounted within the light shields.

10. A method of measuring the rate of flow through a vessel comprising;
    mounting a flexible tube through the vessel generally normal to the direction of flow,
    directing a beam of light axially into one end of the tube,
    detecting the intensity of the beam received at the other end of the tube, and
    allowing fluid flowing through the vessel to deflect said tube in the direction flow, thereby intersecting a portion of said beam of light and decreasing the intensity of the beam at said other end as a function of fluid flow.

11. The method of claim 10 further comprising shielding external light from the ends of the tube and producing a signal corresponding to the flow rate for activating external readout apparatus.

* * * * *